(12) United States Patent
Wu

(10) Patent No.: US 9,378,226 B1
(45) Date of Patent: Jun. 28, 2016

(54) METHOD AND SYSTEM FOR A USER-DEFINED FIELD TYPE

(71) Applicant: Google Inc., Mountain View, CA (US)

(72) Inventor: Yonghua Wu, Oakland, CA (US)

(73) Assignee: Google Inc., Mountain View, CA (US)

(*) Notice: Subject to any disclaimer, the term of this patent is extended or adjusted under 35 U.S.C. 154(b) by 241 days.

(21) Appl. No.: 14/049,971

(22) Filed: Oct. 9, 2013

Related U.S. Application Data

(60) Provisional application No. 61/711,970, filed on Oct. 10, 2012.

(51) Int. Cl.
*G06F 17/30* (2006.01)

(52) U.S. Cl.
CPC .................. *G06F 17/30292* (2013.01)

(58) Field of Classification Search
CPC ................................................ G06F 17/30292
See application file for complete search history.

(56) References Cited

U.S. PATENT DOCUMENTS

| | | |
|---|---|---|
| 7,076,727 B1 | 7/2006 | Flam et al. |
| 7,801,886 B1 | 9/2010 | Gabriel et al. |
| 2005/0080820 A1 | 4/2005 | Koppel et al. |
| 2008/0077941 A1* | 3/2008 | Holmes et al. ............. 719/326 |
| 2009/0144320 A1* | 6/2009 | Weinberg et al. ........... 707/102 |
| 2009/0204635 A1 | 8/2009 | McCormack et al. |
| 2009/0313212 A1 | 12/2009 | Aust |

OTHER PUBLICATIONS

Randal, Inside the Storage Engine Anatomy of a record, Sep. 30, 2007.*

* cited by examiner

*Primary Examiner* — William Spieler
(74) *Attorney, Agent, or Firm* — Fish & Richardson P.C.

(57) ABSTRACT

A computer-implemented method for adding user-configurable data fields to an existing database table is provided. The method is implemented using a computing device including a processor communicatively coupled to a database. The method includes receiving, from a user, a data structure definition defining a custom data type. The method also includes storing the data structure definition as a custom data type record in a custom data types table within the database. The method further includes creating a first values record in a custom values table within the database. The values record includes a first field that includes a series of bytes formatted using at least the custom data type. The method also includes linking the values record to the custom data type record. The method further includes identifying a target record in the existing database table and linking the target record to the first values record through a reference field.

22 Claims, 7 Drawing Sheets

METHOD AND SYSTEM FOR A USER-DEFINED FIELD TYPE

CROSS REFERENCE TO RELATED APPLICATIONS

This application claims priority to and the benefit of the filing date of U.S. Provisional Application No. 61/711,970 filed on Oct. 10, 2012, which is hereby incorporated by reference in its entirety.

BACKGROUND

The field of the disclosure relates generally to data stores, and more specifically, to a method and system for enabling a user to define a custom data type for a data store, and to add an additional field, defined as the custom data type, to an existing data store.

At least some known databases or data storage and retrieval applications include a fixed schema (i.e., a pre-defined structure of the stored data) or a schema that is relatively fixed. As such, data objects, fields, and field types may be difficult to scale to accommodate changing data requirements that were not built into the original schema. Moreover, a data application having the original schema may be used by a diverse set of users, for example, a sales force tasked with selling a variety of products to many different customers. Accordingly, an original database table may be common to all users, but as new products are developed and the sales force is increased to address the new products, additional unforeseen requirements (e.g., additional data) may be needed to support the sales force.

Attempts to remedy such shortcomings include use of user-defined types and custom fields. However, known systems have restricted capabilities. For example, one system uses a single table with five-hundred text columns, stores additional data as strings, and uses metadata tables to define what those columns mean and other tables to manage indexes and constraints. Some known systems cannot support a requirement of over five-hundred custom fields in a data object.

BRIEF DESCRIPTION OF THE DISCLOSURE

In one aspect, a computer-implemented method for adding user-configurable data fields to an existing database table is provided. The method is implemented using a computing device including a processor communicatively coupled to a database. The method includes receiving, from a user, a data structure definition defining a custom data type. The method also includes storing the data structure definition as a custom data type record in a custom data types table within the database. The method further includes creating a first values record in a custom values table within the database. The first values record includes a first field that includes a series of bytes formatted using at least the custom data type. The method also includes linking the first values record to the custom data type record. The method further includes identifying a target record in the existing database table. The method also includes linking the target record to the first values record through a reference field.

In another aspect, a computing device for adding user-configurable data fields to an existing database table is provided. The computing device includes a processor communicatively coupled to a database. The computing device is programmed to receive, from a user, a data structure definition defining a custom data type. The computing device is also programmed to store the data structure definition as a custom data type record in a custom data types table within the database. The computing device is further programmed to create a first values record in a custom values table within the database. The first values record includes a first field that includes a series of bytes formatted using at least the custom data type. The computing device is also programmed to link the first values record to the custom data type record. The computing device is further programmed to identify a target record in the existing database table. The computing device is also programmed to link the target record to the first values record through a reference field.

In yet another aspect, a computer-readable storage media having computer-executable instructions embodied thereon are provided. When executed by at least one processor, the computer-executable instructions cause the processor to receive, from a user, a data structure definition defining a custom data type. The computer-executable instructions also cause the processor to store the data structure definition as a custom data type record in a custom data types table within a database. The computer-executable instructions further cause the processor to create a first values record in a custom values table within the database. The first values record includes a first field that includes a series of bytes formatted using at least the custom data type. The computer-executable instructions also cause the processor to link the first values record to the custom data type record. The computer-executable instructions further cause the processor to identify a target record in the existing database table. The computer-executable instructions also cause the processor to link the target record to the first values record through a reference field.

BRIEF DESCRIPTION OF THE DRAWINGS

FIG. 1 is a diagram of a shared database table that may be configured with custom data types and fields.

FIG. 2 is a diagram illustrating user configuration of customized data types that may be used with the original table shown in FIG. 1, and creating custom values formatted using the custom data types.

FIG. 3 is a diagram of relationship links between the original table shown in FIG. 1 and the custom data type definitions table and custom values table shown in FIG. 2.

FIG. 4 is a data flow diagram for creating a user-defined type and custom field, such as custom data types shown in FIG. 2, in an relationship management (RM) system environment.

FIG. 5 is a data flow diagram of an example database environment for use in RM system environment shown in FIG. 4.

FIG. 6 is a data flow diagram illustrating a process for creating a user-defined data type and custom field in an RM system accordance with an example embodiment of the present disclosure.

FIG. 7 is a diagram of components of one or more example computing devices used with the RM system environment shown in FIG. 4 and the database environment shown in FIG. 5.

DETAILED DESCRIPTION OF THE DISCLOSURE

Figure 1:
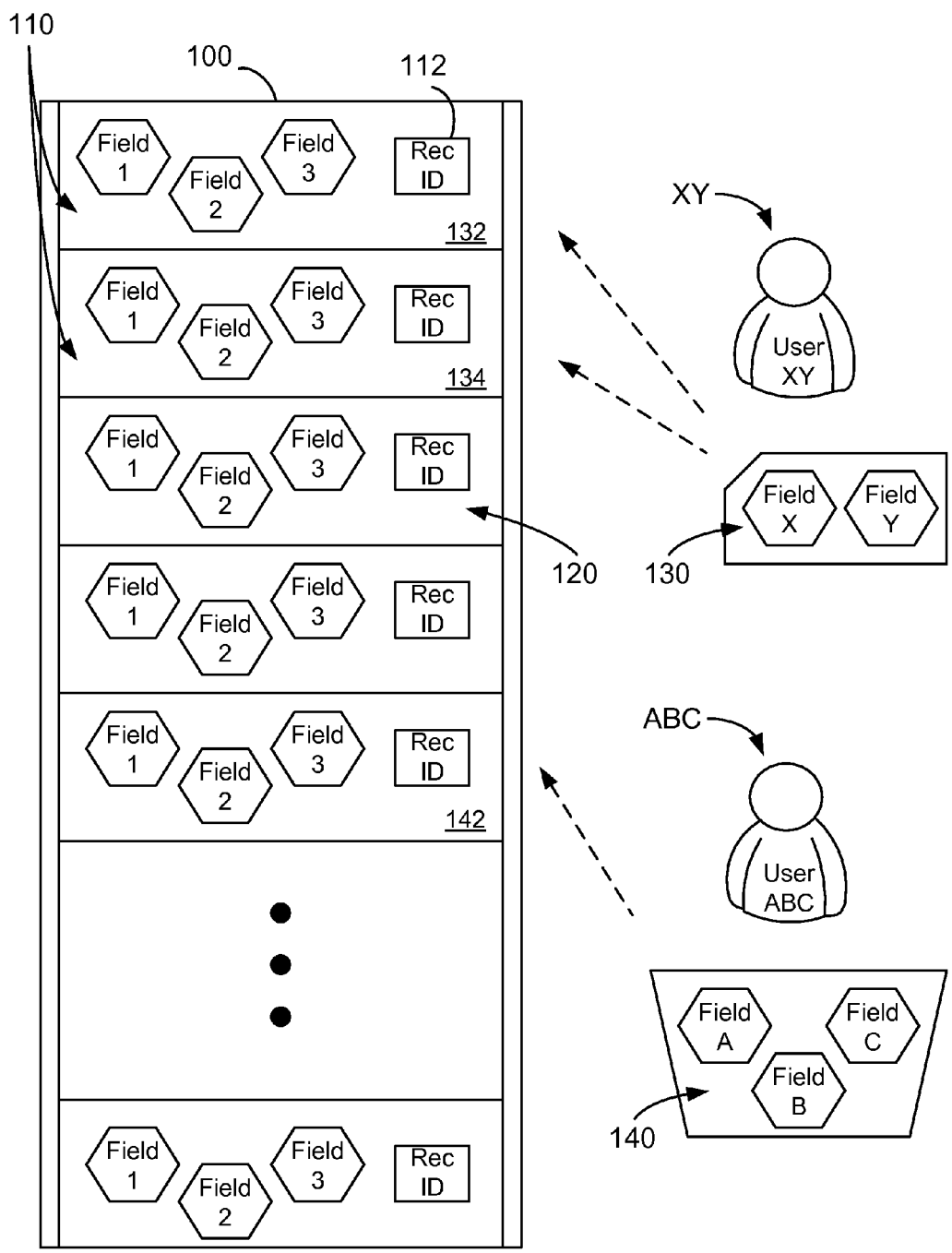
FIGS. 1-7 show example embodiments of the method and system described herein.

Embodiments of the methods and systems described herein enable a user of a database (i.e., a data store) to create customized data types within the database, and to store data within the database using those custom data types. For example, an individual salesperson may use a standard database table ("original table") that is shared among many salespeople. The standard database table may have a set of fields that are commonly used across most or all of the salespeople. However, the individual salesperson may have differing data needs with respect to the products she sells, or the particular customers she serves. In other words, the individual salesperson may wish to have additional fields of data available along with the standard fields already in the table. Further, the other salespersons may also have divergent needs of their own, each of which may desire different fields of data within the table.

In the example embodiment, the individual salesperson provides a structural definition for a custom data type to the database, and to a database management system ("DBMS"). This custom data type defines the structure of the data that the individual salesperson desires to view alongside the contents of the original table. The custom data type may be, for example, a composite of many individual fields of data. For example, presume the original table includes general product information, such as a product name, a product serial number, and a cost per unit of the product. The individual salesperson may wish to also view manufacturer information associated with the product. As such, a custom data type may be defined with two elements (i.e., fields) to support a manufacturer name and a manufacturer phone number. These new elements (i.e., fields for manufacturer name and manufacturer phone number) represent the structural definition of the individual salesperson's custom data type, but do not yet identify the actual data (i.e., the actual information for each manufacturer).

To identify this actual data (i.e., the "target data"), and to associate this data with existing records in the original table, an identifier field is identified in or added to the original table. This identifier field does not directly contain the target data but, rather, serves as a reference for how to retrieve the target data. More specifically, the identifier field is used by another data object (i.e., a "target data object") that contains the target data. Further, this target data is stored in a format as defined by the custom data type. The target data object also includes reference identifier that links the target data object to the custom data type defined by the individual user. As such, the DBMS may access the custom data type definition using the reference identifier, enabling the DBMS to parse the target data for presentation to, for example, the individual salesperson.

Accordingly, the systems and methods described herein enable multiple users to define a plurality of custom data types. Further, each row of the original table may be associated independently with one or more of the custom data types, and each may reference different "target data." As such, different users may customize their view of the shared table without adding all of the target data to the original table.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, systems and methods of defining a previously undefined data type and custom fields in a data application. However, it is contemplated that this disclosure has general application to data systems in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

FIG. 1 is a diagram of a shared database table 100 that may be configured with custom data types and fields. In the example embodiment, table 100 is an existing database table that is shared between a plurality of users, such as user XY and user ABC. However, each user may desire to customize table 100 to provide data that is not already stored therein.

In the example embodiment, table 100 includes a plurality of records (i.e., data objects) 110. Each record 110 has an associated structure for the data contained within (i.e., a template, or "data structure", defining the format of individual data elements stored therein). The template for each record 110 includes a plurality of fields 120, such as "Record ID" 112, "Field 1", "Field 2", and "Field 3". Each field 120 is defined by a data type that generally describes the type of data stored within. Some example primitive data types include integers (i.e., whole numbers), floating-point numbers (i.e., decimal numbers), strings (i.e., a sequence of one or more characters), and date/time. For example, "Field 1" may be a string field for storing a product name, "Field 2" may be an integer for storing a product serial number, "Field 3" may be a floating-point number for storing a per-unit price of the product, and "Record ID" 112 may be a unique integer. In the example embodiment, record ID 112 is an identifier (ID) field, and each record 110 has a unique value such that each individual record may be located using the value (i.e., distinguished from all the others).

In the example embodiment, each record 110 contains different data (i.e., the fields 120 may contain differing data), but each record 110 has the same type and number of fields (i.e., all of the records 110 share the same template, or data structure). For example, in some embodiments, table 100 is a relational database table. In some known relational databases, a database table has a single definition describing its data structure (i.e., a single template that defines the structure of all records in the table), and each new record added to the table conforms to this shared structure. In other embodiments, table 100 is an object oriented database table. In some known object oriented databases, data objects (i.e., records of the table) are created from a shared, common class, and each instance of a data object inherits its structure from the common class. As such, under either type of database, each record shares a common structure. As such, table 100 contains a set of data that users may access (i.e., the data in the various fields 120 of each record 110).

Users may wish to customize the data available in table 100. For example, some users may wish to view manufacturer data associated with each product, and other users may wish to view inventory data associated with each product. In some known systems, an administrator may add the desired data to table 100. For example, additional fields 120 may be added for the desired manufacturer data, and new fields 120 may be added for the desired inventory data. However, changing the shared structure of table 120 may require adding all of the new fields to all of the records. Some users may not desire to see the manufacturer data, and other users may not desire to see the inventory data.

In the example embodiment, users customize additional data to associate with records 110, and they may do so individually (i.e., independently) for each record 110. Presume, for example, that user XY is a salesperson associated with two products, and the data for these two products are stored in two records 132 and 134. In addition to the fields in records 132 and 134 (i.e., the standard fields 1, 2, and 3), user XY desires to see manufacturing data associated with additional fields 130, represented here as "Field X" and "Field Y". Further, presume that another salesperson, user ABC, is associated with a different product, and the data for that product is stored in a separate record 142. In addition to the fields in record 142 (i.e., the standard fields 1, 2, and 3), user ABC desires to see inventory data associated with additional fields 140, represented here as "Field A", "Field B", and "Field C." The systems and methods described herein enable users to custom configure sets of data, such as fields 130 and fields 140, and associate that data with individual records 110 of a table, such as records 132, 134, and 142

Figure 2:
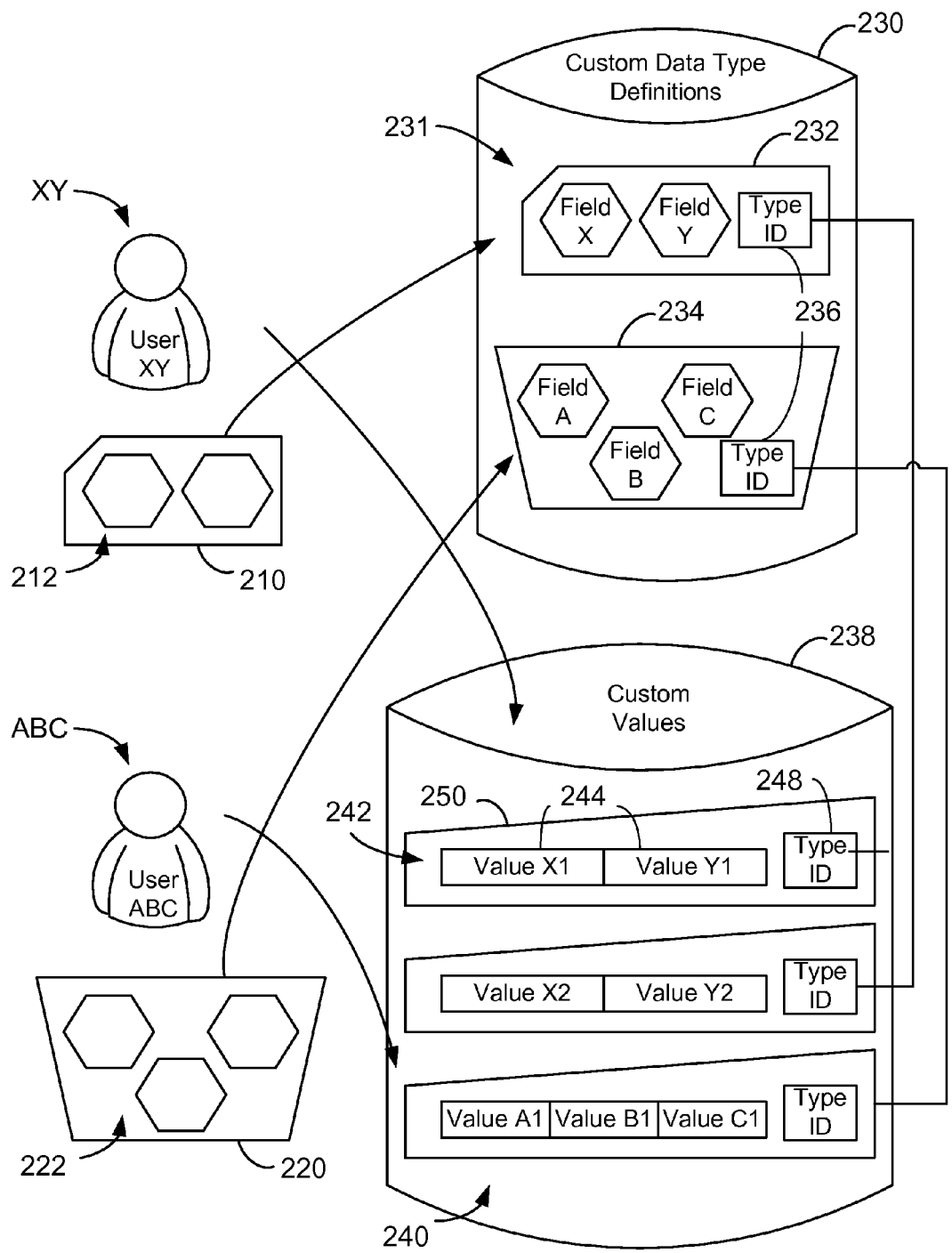

FIG. 2 is a diagram illustrating user configuration of customized data types that may be used with the original table shown in FIG. 1, and creating custom values formatted using the custom data types. In the example embodiment, user XY defines a custom data type 210 that contains one or more fields 212. Further, user ABC defines another custom data type 220 that contains one or more fields 222. Custom data types 210 and 220 are data structure definitions defining the format of, for example, a data object or a data record. Each data type includes data definition for fields 222 such as, for example, field name (e.g., "manufacturer name") and data type (e.g., integer, string, etc.). In other words, data types contain a structure, or template, for data, and not the values assigned to an instance of the data object. In the example shown in FIG. 2, User XY defines custom data type 210 to contain two fields, represented as "Field X" and "Field Y". The data types associated with these fields may be, for example, a string of 30 bytes for "manufacturer name", and a string of 10 bytes for "manufacturer phone number." As such, custom data type 210 may be referred to as a composite, or complex, data type, as it defines a structure for multiple sub-elements (i.e., multiple fields).

In the example embodiment, User XY creates custom data type 210, and User ABC creates custom data type 220. These custom data types 210 and 220 are submitted to be stored in a custom data type definitions table 230 as custom data types 232 and 234. Each custom data type 232 and 234 also receives a Type ID 236. Type ID 236 is a reference ID unique to each data type stored within custom data type definitions 230, similar to record IDs 112 in table 100 (shown in FIG. 1). As such, each individual custom data type 232 and 234 may be identified using its unique Type ID 236. Creation of custom data types 210 and 220, and submission for storage in custom data type definitions table 230 is described in greater detail below in reference to FIGS. 5 and 6.

In addition to creating and storing custom data types 210 and 220, users XY and ABC also identify custom values 240 that are formatted using the custom data types 210 and 220. In the example embodiment, these custom values 240 are stored in a custom values table 238. Custom values 240 hold data values, for example, for the new fields that Users XY and ABC desire to see in table 100. Each custom value 240 includes at least two data elements: a composite value element 242 and a Type ID 248. Composite value element 242 is a series of bytes (also referred to herein as a "binary block" and a "byte block") that contains one or more values within. In the example embodiment, value element 242 includes two sub-values 244, "Value X1" and "Value Y1". Type ID 248 is a reference identifier that links to one of the custom data types in custom data type definitions table 320, such as custom data types 232 or 234. The particular custom data type pointed to by Type ID 248 defines how to decompose the sub-values 244 from the value element 242. In other words, value element 242 is a byte block, and the custom data type referenced by Type ID 248 allows that byte block to be separated into the individual sub-values 244.

For example, and continuing the example described above, presume User XY stores a custom value 250 that he intends to use for record 132 (shown in FIG. 1). More particularly, presume User XY stores a 40 character byte block as value element 242, which has a manufacturer name in the first 30 characters of value element 242 (i.e., "Value X1" as the first sub-value 244), and a manufacturer phone number as the last 10 characters of value element 242 (i.e., "Value Y1" as the second sub-value 244). User XY then links this value element 240 to the custom data type that has the structural definition necessary to decompose the value element 242. In other words, User XY defines the Type ID 248 field of custom value 250 to the Type ID 236 identifier of custom data type 232 (i.e., User XY's custom data type defining a first field of 30 characters for a manufacturer name and a second field of 10 characters for a manufacturer phone number). As such, a new custom value 250 is present in custom values table 238, and it contains a link to the data necessary to decompose the data.

Figure 3:
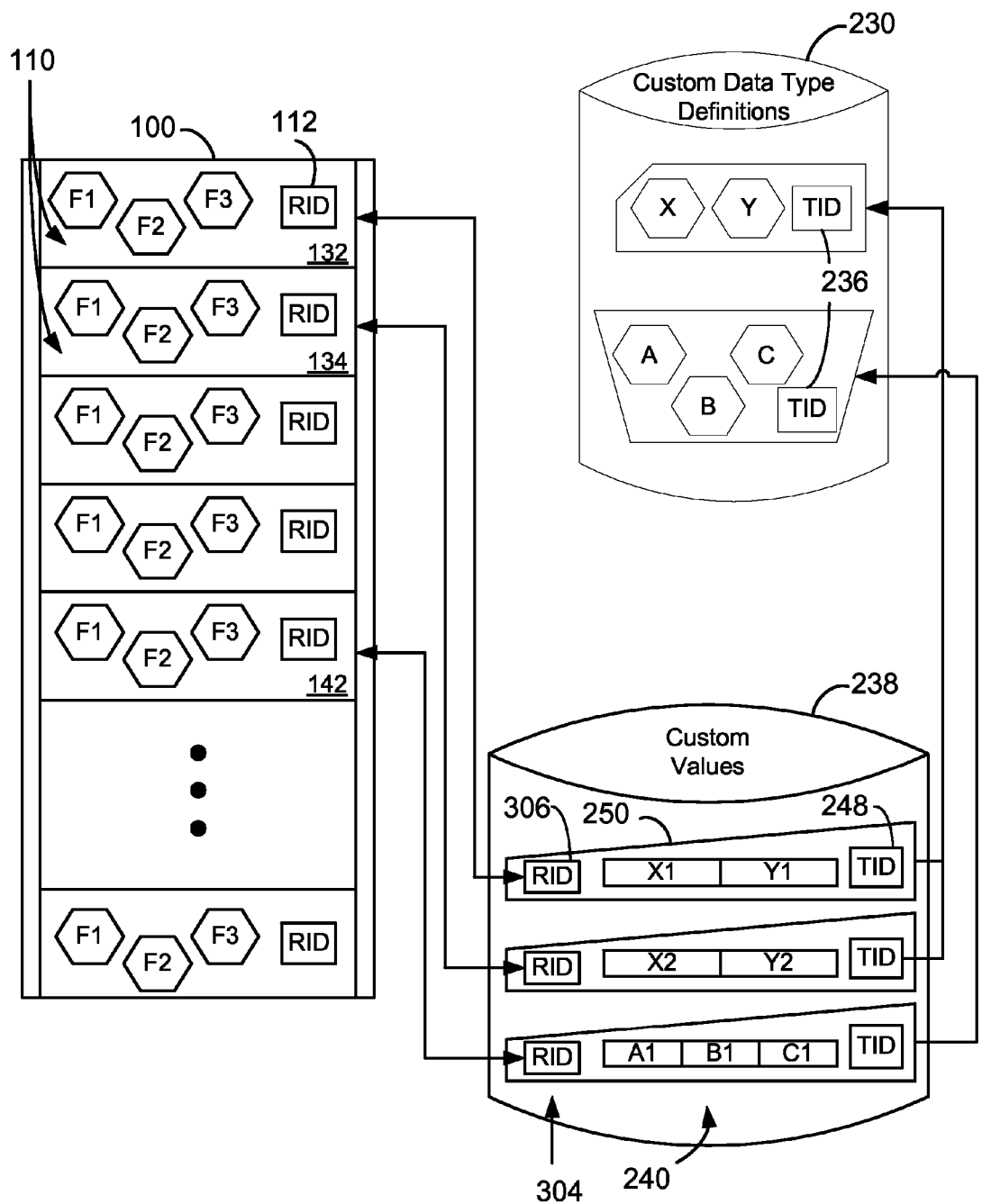

FIG. 3 is a diagram of relationship links between the original table 100 shown in FIG. 1 and the custom data type definitions table 230 and custom values table 238 shown in FIG. 2. In the example embodiment, custom values are associated with (i.e., linked to) records 110 of table 100. More specifically, each custom value 240 may include a record ID field 304 ("RID"). A particular custom value 240, such as custom value 250, may be linked to an individual record 110, such as record 132, by storing the RID 112 of record 132 in the RID field 306 of custom value 250. As such, records 110 from table 100 are logically coupled to additional custom values 240 in custom values table 238 (through RID's 304 and 112), and those custom values 240 are logically coupled to the custom data types 231 in custom data type definitions table 230 (through TID's 236 and 248) used to decompose them.

Figure 4:
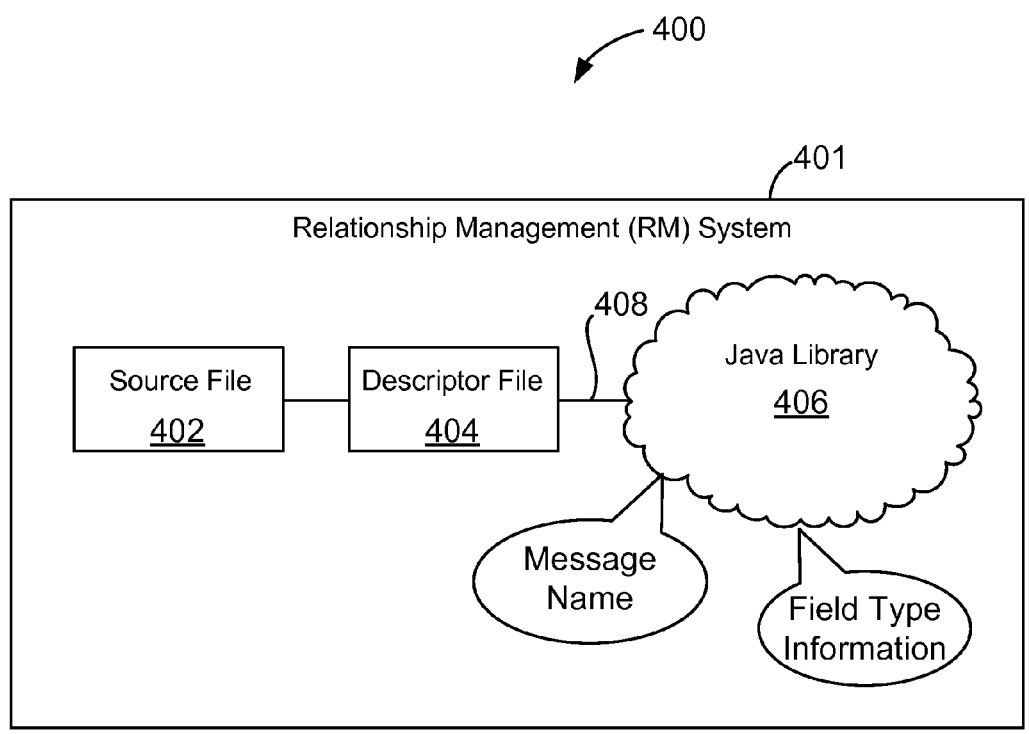
Figure 5:
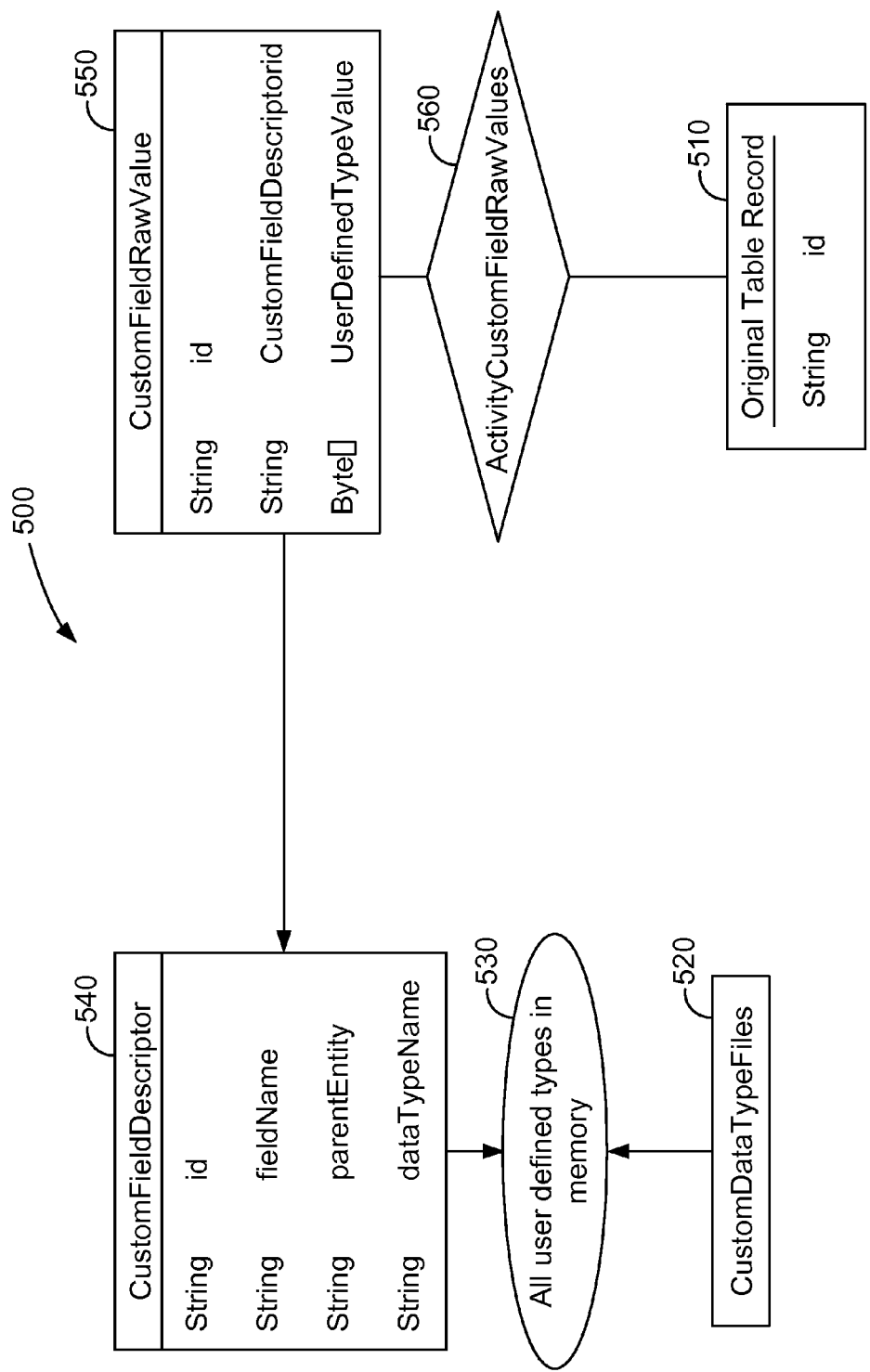
Figure 6:
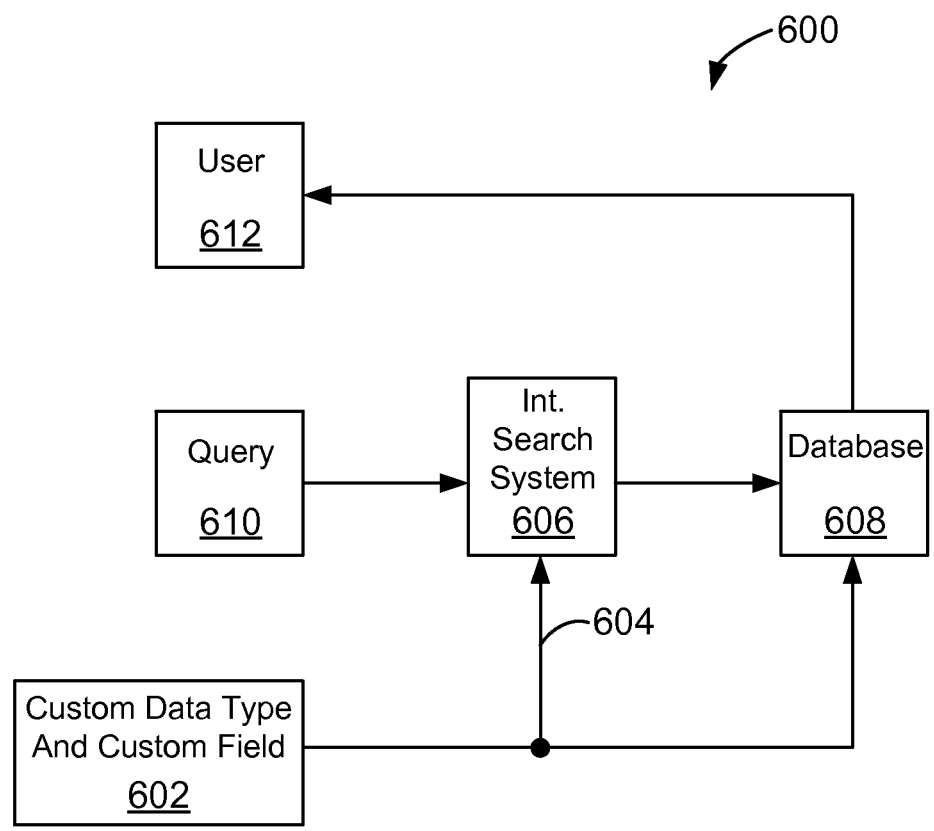

In reference now to FIGS. 4-6, FIGS. 4 and 5 describe detailed embodiments for enabling a user, such as Users XY and ABC (shown in FIGS. 1 and 2), to create and store custom data types and custom values. FIG. 6 describes detailed embodiments for enabling search queries against the "encoded" data stored in the custom values.

FIG. 4 is a data flow diagram for creating a user-defined type and custom field, such as custom data types 231 (shown in FIG. 2), in an RM system environment 400. Embodiments of the present disclosure describe a method and system for defining custom fields used on model objects of a data application. Although some embodiments relate to a database, such methods and system may be used with any data store or information retrieval system. A custom field can be a simple type, for example, a number or a string, but to support all users and products they are concerned with, the data being hosted in the application could be very complex. Moreover, the data could evolve too. For example, today the users may have a complex object with three types, three fields and later on the users require may increase to ten or more fields. A solution for permitting the data application to support a custom field of both the single type and custom field of arbitrary complex type is described below.

To permit a data application to scale or permit expanded capabilities, user-defined types and custom fields are used to solve the above problems. User-defined types permit extracting data from another system, push the data to the data application, and store the data in a generic form for search and display. Moreover, the use of custom fields permits extending the data application data model with arbitrary fields for each particular user's tracking needs.

In the example embodiment, an integrate sales management (SM) system/relationship management (RM) system uses user-defined types and custom fields. SM is a system for sales persons to create proposals of a display campaign. The proposal has an identifier, total budget, line items about where budget is spent (for example: $500 to run flash ads on a video-based web page). When a sales person creates a goal to have an advertiser run a $5000 display campaign, it is desirable to have the RM show the related SM proposal information together with the goal, so that the sales person can have one place to view all his data. Because the SM data and a search in the RM system 400 can be arbitrarily complex, depending on the users' needs, user-defined types are used to define the data to be pulled from the SM system to the RM system 400. A custom field is used to add a field onto another table (i.e., an original table) whose type is the user-defined type for the SM system. Accordingly, data can be added/removed easily without changing the goal model object and database tables.

For example, a user-defined type called "Sm" is created to hold data from the SM system. Other embodiments may use user-defined types for integrating with other tools/systems that sales teams use. A custom field is used to host data that does not fit into any existing fields in the RM system 400 model objects. A user-defined type is used to host data mastered on another system, especially if the data can be arbitrarily complex (as in the SM case), or if the data is simple currently, but may evolve to a complex object in the future.

In the example embodiment, RM system 400 is embodied in a computing device 401. A user provides a source file 402 having a predefined format and includes a definition of the user-defined type. In the example embodiment, Protobuf (i.e., "Protocol Buffers") is used for defining user-defined types (e.g., custom data types 231 (shown in FIG. 2)). ("Protocol Buffers" is a method and suite of software procedures for serializing structured data developed by Google Inc., a Delaware corporation). Although described in terms of using Protobuf as the method of encoding structure data and communication between systems, it should be recognized that other technologies are anticipated. Using Protobuf, another system can send data as a byte array in Protobuf, and RM system 400 is able to parse the sent data if that Protobuf data is defined as a user-defined type in RM system 400. Protobuf includes defined rules to evolve user-defined type in a backwards compatible way. Because RM system 400 persists data of the user-defined type, it is important that a new version of a user-defined type is compatible with the persisted data that was written with the old version. Protobuf is a common opensource technology that permits adding annotation using custom options to annotate user-defined fields for search and reporting.

An example Protobuf file for defining a user-defined type includes several messages. As used herein, the terms "custom data type" and "user-defined type" are used interchangeably. Each message in the file maps to one "user-defined type". For example, below is a first message in the example file:

package grm;
message Proposals {
  repeated DsmProposal proposal=1;
}

Each user-defined type has the format of: package_name.message_name. Following this rule, the example message above maps to a user-defined type: grm.Proposals. The reason of including package name is to ensure that the user-defined type has unique name in RM system 400. Without a package name, it is possible that two external teams can define the same message name and result in the conflict in user-defined type. The package name needs to be unique in RM system 400, which is enforced when a user uploads the Protobuf files to RM system 400.

After the user-defined type is provided to RM system 400 in Protobuf format, the type information needs to be accessed at runtime. The type information needed includes: message type defined in the Protobuf, field information in message, and any custom options specified. This is done using Protobuf descriptors.

A Protobuf descriptor 404 is a file that is generated from .proto source file 402. Descriptor file 404 includes all the type information encoded in it. Protobuf includes a Java library 406 that takes Protobuf descriptor 404 as data input 408 and provides type information at runtime.

Protobuf also provides a tool to generate descriptor file from .proto file. A build rule called "proto_descriptor_set" permits end users to use this tool. The following is an example of generating the descriptor file using the build rule:

Include the build rule that generates the metadata file.
subinclude('//java/c/g/crm/grm/customdata/tools:
  BUILD_DESCRIPTOR_SET')
proto_descriptor_set(
  name="dsmproto_descriptor_set", # name of the build rule
  src="dsm.proto", # protobuf source file
  out="dsm_descriptor_set", # generated descriptor file.)
)

On command line:
>blaze build . . . /path-to-BUILD-file:proto_descriptor_set

FIG. 5 is a data flow diagram of an example database environment 500 for use in RM system environment 400 (shown in FIG. 4). In the example embodiment, the Protobuf descriptor is stored in RM system 400 by uploading two files to create the new user-defined types: the source proto file and the Proto descriptor file generated from the source proto file using the Protobuf tool. Each set of files includes a unique name enforced by RM system 400. For example, if a Protobuf is created for the SM system data, the Protobuf may be named "DSM data types". This name is used to view the existing user-defined types in, for example, a user interface (UI).

A table "CustomDataTypeFiles" 530 is created to store the information of the Protobuf metadata files 520.

TABLE 1

| Column name | Type | Definition |
| --- | --- | --- |
| Id | long | Auto generated Id |
| Name | String | The name that specify the data type file Unique identifier of a file across all versions. |
| PackageName | String | Value of package_name in Protobuf. |
| CreateTime | Timestamp | The time when this version of user-defined type is created. |
| ProtobufFileId | varchar | Foreign key to Attachments table |
| DescriptorFileId | varchar | Foreign key to Attachments table |
| IsActive | boolean | True if this is the active version. When uploading a new Protobuf metadata file, the currently active one is deactivated. |
| CreatedBy | String | User who uploads the files. Foreign key to Users table. |

Further, in the example embodiment, a "CustomFieldDescriptors" table 540 is created to hold custom field information. In some embodiments, CustomFieldDescriptor table 540 is similar to custom data type definitions table 230 (shown in FIG. 2).

TABLE 2

| Column name | Type | Definition |
|---|---|---|
| Id | long | Auto generated Id |
| UserDefinedTypeName | long | Name of the user-defined type in the form of package_name.message_name. Must be defined in one of the latest version of ProtoBuf files. |
| DisplayName | String | This is the label displayed in the UI for that field. "Label" is not used as a column name to avoid confusion with label object in the RM system. |
| Name | String | Name of the field. It is used in the code to refer to this custom field. |
| ParentEntity | enum | Entity that this field belongs to. For example: when a "dsm" field is created in Goal object, the parent entity will be "GOAL". Currently, the enum has "GOAL" and "TASK". To a support custom field in other RM system entities such as company, contacts, new enums are added for them. |

There is a unique key constraint on (Name, ParentEntity) to prevent defining two fields with the same name in one model object. If the preferred name is already taken an alternate is selected. In various embodiments, custom names may be deleted, so that field names may be freed up for subsequent use when they are no longer needed. In one embodiment, a UI is used for defining custom fields. In other embodiments, a database migration is used to populate a new row manually in the production database.

In the example embodiment, a "CustomFieldRawValues" table 540 is created to hold custom field values. In some embodiments, CustomFieldRawValues table 540 is similar to custom values table 238 (shown in FIG. 2).

TABLE 3

| Column name | Type | Definition |
|---|---|---|
| Id | long | Auto generated Id |
| CustomFieldDescriptorId | long | Foreign key to the CustomFieldDescriptors table. |
| UserDefinedTypeValue | mediumblob | Protobuf value in bytes. MySQL uses blob type for storing large binary data. Mediumblob can store up to 16M data, which should be enough for foreseeable future. |

If a goal instance has a custom field value, there will be a row with (goal id, custom field value id) in the join table between Activities table (the parent table of Goal table) and CustomFieldRawValues table 540.

A "ActivityCustomFieldRawValues" table 560 represents the one-to-many relationship between a goal instance and its custom field values.

This section explains how custom field works with the existing GRM in different areas to expand the RM system object.

Goal object may be used as an example. Goal object has a set of CustomFieldRawValue 540 objects:
    Class Goal {
        Set<CustomFieldRawValue> customFieldRawValues;
    }
Each CustomFieldRawValue 540 object represents a value for one custom field on the goal. It also maps to one row in the DB table "CustomFieldRawValues" 540:
    public class CustomFieldRawValue {
        // primary key
        String id;
        // Describes the custom field
        CustomFieldDescriptor customFieldDescriptor;
        // value of the custom field
        byte[ ] userDefinedTypeValue;
    }

A real use case is used to explain how a new custom field value is added in a Goal instance. In Display Proposal Manager integration project, a user-defined type is created using the Protobuf file shown below (for simplicity, the most unimportant fields are excluded):
    package grm;
    message DpmProposals {
        repeated DpmProposal proposal=1;
    }
    message DpmProposal {
        optional int64 id=1;
        optional string title=2;
    }
This proto file defines two user-defined types: grm.DpmProposals and grm.DpmProposal. A custom field in Goal is defined with field name "dpmProposals" and type "grm.DpmProposals".

The following is an example of the code used to add a new value for this field in a Goal instance given a dpmProposals object in its ProtoBuf format.
    // Given DPmProposals in its Protobuf format, save as custom field in Goal object.
    void addDpmProposalsAsCustomField(Goal goal, DpmProposals proposals) {
        // Look up custom field by field name and parent entity.
        CustomFieldDescriptor fieldDescriptor=
            service.lookup ("dpmProposals", ParentEntity.GOAL);
        // Convert DpmProposals ProtoBuf to bytes
        byte[ ] value=proposals.toByteArray( );
        // Construct the CustomFieldRawValue object
        CustomFieldRawValue newRawValue=new CustomFieldRawValue.Builder( )
            .withCustomDataTypeRawValue(value)
            .withCustomFieldDescriptor(fieldDescriptor)
            .build( );
        // Add this new CustomFieldRawValue to goal object.
        goal.getCustomFieldValues( ).add(newRawValue);
    }
To fetch a custom field value, the name of the custom field must be known. Then a loop through the list of CustomFieldRawValues 540 is performed until the one with the matching field name is found.

Similar to annotation in Java, Protobuf supports annotation of each field with custom data. The annotations are used to specify search configurations for each field. The search options used are listed in the table below.

TABLE 4

| Option | Description |
|---|---|
| indexed | True means that the field should be indexed. |
| index_format | This option can have values EXACT or PREFIX. When set to EXACT it looks for exact match between search value and actual field value. PREFIX is useful when the field to be indexed is of type string and allows prefix matching in search. |

Moreover, additional considerations of the indexed custom field include: (1) only primitive fields are indexed, so a user should not put this option on fields whose type is not primitive; the system uses an existing search service (SS) for structured data. Every field indexed in the SS has a unique field name. It is constructed as: CustomFieldId_Nested_ProtoTagId. CustomFieldId is used to allow renaming a custom field without affecting the SS index. This also applies to the FieldTagId. The SS supports queries that mix text and attribute expressions in arbitrary ways and data is stored in a document as key-value pairs. Specifying a field to be indexable will have the data of custom fields indexed in the SS doc. To enable search functionality in the RM system UI, there is also another field, "Search Configuration".

Search configuration in RM system 400 is stored in Megastore. It specifies: (1) SS fields that can appear as search criteria in the RM system UI; (2) SS fields that can appear as a column in the search result in the RM system UI; and (3) data type of an SS field in the UI. For example, if a custom field defines a date, its value is stored in the SS document as a number. But when the user specifies search criteria on this field, it should allow date-related operations such as "before" and "after". Such a configuration overcomes the limitations of a search configuration that is hard coded and manually updated when a new field is introduced and is not scalable with custom fields. Such a configuration permits an automatically generated search configuration for custom fields on the fly.

FIG. 6 is a data flow diagram 600 illustrating a process for creating a user-defined data type and custom field in an RM system 400 in accordance with an example embodiment of the present disclosure. In the example embodiment, a user-defined data type and custom field are generated 602 as described with reference to FIGS. 4 and 5. Initially, the documents are built and then stored in the existing search system. The user-defined data type and custom field system receives data X of a user defined type as input, builds the document with a key-value (key is the custom field name, value is the input data X) using the information in the user defined type and custom field, then stores that document in the existing search system.

With the document stored in the existing search system, when a search query is received, the search query is directed to the existing search system for the matching document. The matching document contains the information needed to locate the actual data row in the database. At runtime, the generated files are read so that when a query is received the new user-defined data type and custom field are able to be used to build the query. The user-defined data type and custom field are transformed 604 into a plain text key-value pair document with the field name as the key and the data for the field as the value and sent to an intermediary search system 606. The user-defined data type and custom field are stored in a database 608 as binary blocks, which is a form the query can not resolve directly.

A query 610 is initiated to locate all fields that have the user-defined data type and custom field having data in a specified range. Because database 608 cannot answer the query directly due to the user-defined data type and custom field data being stored in binary blocks, the query is intercepted by intermediary search system 606 where the user-defined data type and custom field are stored as text key value pairs. Intermediary search system 606 returns documents that meet the search criteria and extracts the value of the document. The value is used to query database 608. Using the returned value, the query retrieves all documents containing the value and outputs the query result to a user 612.

Figure 7:
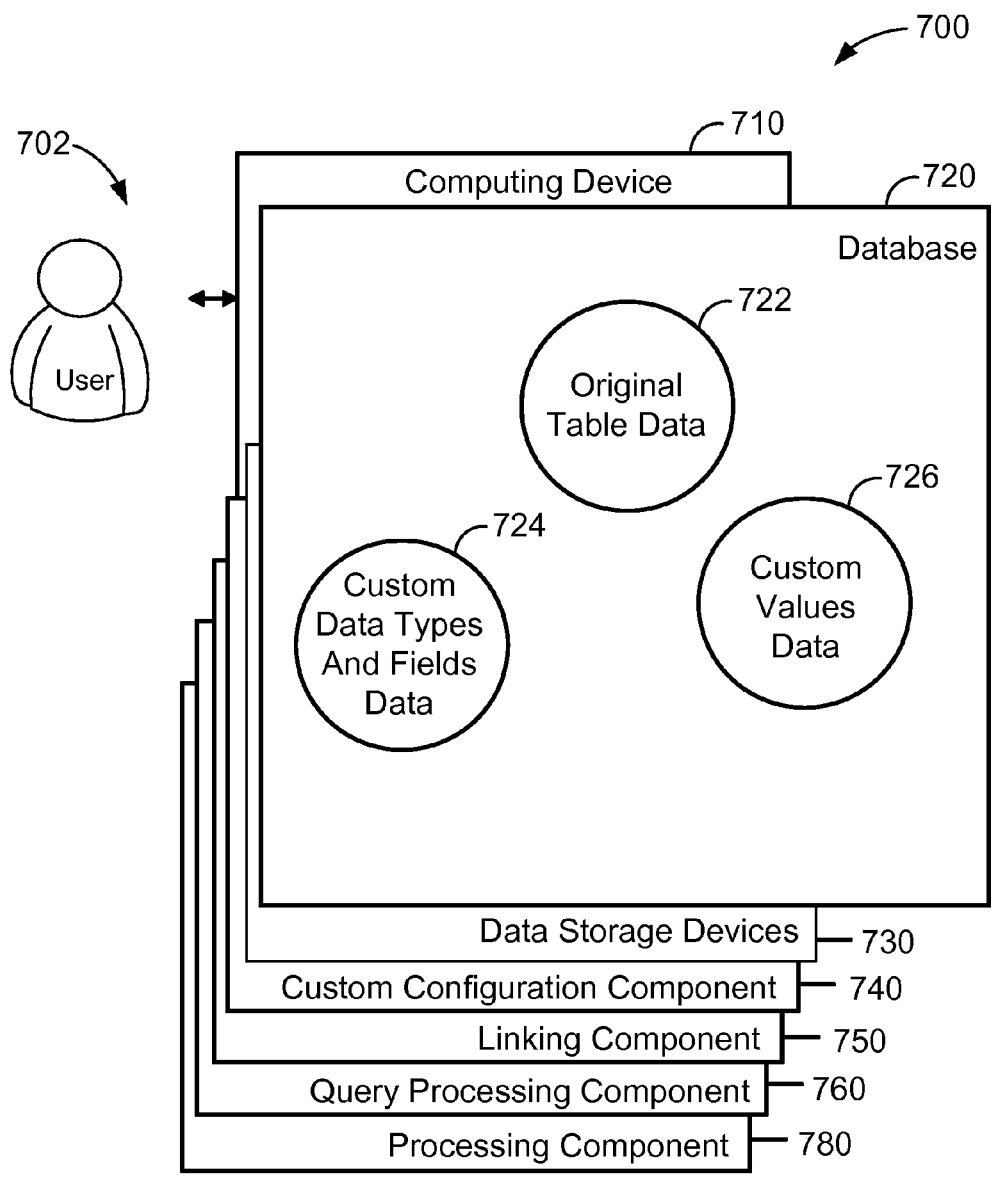

FIG. 7 is a diagram of components of one or more example computing devices 710 used with the RM system environment 400 (shown in FIG. 4) and the database environment 500 (shown in FIG. 5). One or more of computing devices 710 may form RM system environment 400. FIG. 7 further shows a configuration 702 of databases. Database 708 is coupled to several separate components within RM system environment 400, which perform specific tasks.

In the exemplary embodiment, database 720 includes original table data 722, custom data types and fields data 724, and custom values data 726. Original table data 722 includes information associated with the original table to which custom values are associated, such as table 100 (shown in FIG. 1). Custom data types and fields data 724 includes data associated with the custom data types created by users and stored in, for example, custom data type definitions table 230 (shown in FIG. 2). Custom values data 726 includes the custom values records stored in, for example, custom values table 238 (shown in FIG. 2) and customFieldRawValue table 540 (shown in FIG. 5).

Computing device 710 includes database 720, as well as data storage devices 730. Computing device 710 also includes a custom configuration component 740 for receiving custom data type definition 724 information and custom values data 726. Computing device 710 also includes a linking component 750 for establishing connections between data elements and for creating search documents associated with custom values data 726. A query processing component 760 is also included for intercepting and/or processing queries associated with custom values data 726. A processing component 780 assists with execution of computer-executable instructions associated with the tokenless authentication system.

These components or modules, which may be embodied in software programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

Computing device 710 includes a processor, a memory, and a storage device connecting to the memory. The processor can process instructions for execution within the computing device 710, including instructions stored in the memory or on the storage device to display graphical information for a GUI on an external input/output device, such as a display. In other implementations, multiple processors may be used, as appropriate, along with multiple memories and types of memory. Also, multiple computing devices 710 may be connected, with each device providing portions of the necessary operations (e.g., as a server bank, a group of blade servers, or a multi-processor system).

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is an ability to extend a data application model by permitting a user to define their own data type inside the data application and to add custom fields to the existing data application data model wherein the custom fields are fields defined in the data application model objects at the run time and can be of standard data types (such as integer, string, date) or of a user-defined type. Moreover, the technical effect includes an ability to define a user-defined type in the data application, to upgrade the existing user-defined type in a backwards compatible way, to define a custom field of a user-defined type in an existing data application entity, to render data of a user-defined type in a UI, and to search and display data of user-defined type in search page. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of creating a user-defined data type and a custom field in a database provides a cost-effective and reliable means for improving the scalability of a data application in support of selling different products and making the data application customizable. In addition, the above-described methods and systems facilitate overcoming shortcomings in some databases that have a fixed schema. As a result, the methods and systems described herein facilitate expanding the capabilities of database systems in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method comprising:

identifying, in a relational database, a first table, a custom data types table, and a custom values table that are each distinct from each other;

receiving, from a user, a first data structure definition that identifies a first custom data type;

storing the first data structure definition as a first custom data type record in the custom data types table within the database, the custom data types table including a plurality of custom data type records that each define a unique custom data type;

creating a first values record in the custom values table within the database, the first values record including a first field that includes a series of bytes formatted according to the first custom data type;

linking the first values record in the custom values table to the first custom data type record in the custom data types table by generating a first identifier in the first values record that references the first custom data type record, wherein a second values record in the custom values table is linked to a different, second custom data type record among the plurality of custom data type records in the custom data types table; and linking a target record in the first table to the first values record in the custom values table by generating a second identifier in the first values record that references the target record.

2. The method of claim 1 further comprising:
receiving a query request identifying the target record;
retrieving the first field from the first values record using at least the second identifier in the first values record that references the target record;
decomposing the series of bytes from the first field of the first values record into a plurality of values using at least the first custom data type; and
providing the plurality of values in response to the query.

3. The method of claim 1, wherein receiving the first data structure definition comprises:
receiving a file from the user defining the first custom data type, the file formatted using a serialized data structure; and
converting the serialized data structure into the first custom data type.

4. The method of claim 3, wherein receiving the file from the user comprises:
identifying, in the file, source value data; and
composing the series of bytes to be stored in the first field.

5. The method of claim 1 further comprising:
decomposing the series of bytes from the first field of the first values record into a plurality of values using at least the first custom data type;
creating a plurality of key-value pairs from the plurality of values, each key-value pair including a name associated with a sub-value and the sub-value; and
creating a document including the plurality of key-value pairs.

6. The method of claim 5 further comprising:
identifying the document during a search for the sub-value contained in the document; and
identifying the target record based at least in part on a reference identifier identified as a result of the search for the sub-value.

7. The method of claim 1 further comprising:
providing, to the user, a graphical interface;
presenting, to the user, a plurality of custom data types defined in the custom data types table using the graphical interface; and
creating a new custom values record in the custom values table based at least in part on selection of one of the plurality of custom data types presented to the user.

8. The method of claim 1, wherein:
the first custom data type record indicates a first set of rules for decomposing the series of bytes included in the first field of the first values record, and
a second custom data type record among the plurality of custom data type records in the custom data types table indicates a different, second set of rules for decomposing a series of bytes included in a first field of the second values record in the custom values table.

9. A computing device comprising a processor communicatively coupled to a relational database, said computing device programmed to:
identify, in the relational database, a first table, a custom data types table, and a custom values table that are each distinct from each other;
receive, from a user, a first data structure definition that identifies a first custom data type;
store the first data structure definition as a first custom data type record in the custom data types table within the database, the custom data types table including a plurality of custom data type records that each define a unique custom data type;
create a first values record in the custom values table within the database, the first values record including a first field that includes a series of bytes formatted according to the first custom data type;
link the first values record in the custom values table to the first custom data type record in the custom data types table by generating a first identifier in the first values record that references the first custom data type record, wherein a second values record in the custom values table is linked to a different, second custom data type record among the plurality of custom data type records in the custom data types table; and
link a target record in the first table to the first values record in the custom values table by generating a second identifier in the first values record that references the target record.

10. The computing device of claim 9, wherein said computing device is further programmed to:
receive a query request identifying the target record;
retrieve the first field from the first values record using at least the second identifier in the first values record that references the target record;
decompose the series of bytes from the first field of the first values record into a plurality of values using at least the first custom data type; and
provide the plurality of values in response to the query.

11. The computing device of claim 9, wherein said computing device is further programmed to:
receive a file from the user defining the first custom data type, the file formatted using a serialized data structure; and
convert the serialized data structure into the first custom data type.

12. The computing device of claim 11, wherein said computing device is further programmed to:
identify in the file source value data; and
compose the series of bytes to be stored in the first field.

13. The computing device of claim 11, wherein said computing device is further programmed to:
decompose the series of bytes from the first field of the first values record into a plurality of values using at least the first custom data type;
create a plurality of key-value pairs from the plurality of values, each key-value pair including a name associated with a sub-value and the sub-value; and
create a document including the plurality of key-value pairs.

14. The computing device of claim 13, wherein said computing device is further programmed to:
identify the document during a search for the sub-value contained in the document; and
identify the target record based at least in part on a reference identifier identified as a result of the search for the sub-value.

15. The computing device of claim 9, wherein said computing device is further programmed to:
provide to the user a graphical interface;
present to the user a plurality of custom data types defined in the custom data types table using the graphical interface; and
create a new custom values record in the custom values table based at least in part on selection of one of the plurality of custom data types presented to the user.

16. A computer-readable storage media having computer-executable instructions embodied thereon, wherein when executed by at least one processor, the computer-executable instructions cause the at least one processor to:

identify, in a relational database, a first table, a custom data types table, and a custom values table that are each distinct from each other;

receive, from a user, a first data structure definition that identifies a first custom data type;

store the first data structure definition as a first custom data type record in the custom data types table within the database, the custom data types table including a plurality of custom data type records that each define a unique custom data type;

create a first values record in the custom values table within the database, the first values record including a first field that includes a series of bytes formatted according to the first custom data type;

link the first values record in the custom values table to the first custom data type record in the custom data types table by generating a first identifier in the first values record that references the first custom data type record, wherein a second values record in the custom values table is linked to a different, second custom data type record among the plurality of custom data type records in the custom data types table; and link a target record in the first table to the first values record in the custom values table by generating a second identifier in the first values record that references the target record.

17. The computer-readable storage media of claim 16, wherein the computer-executable instructions further cause the at least one processor to:

receive a query request identifying the target record;

retrieve the first field from the first values record using at least the second identifier in the first values record that references the target record;

decompose the series of bytes from the first field of the first values record into a plurality of values using at least the first custom data type; and provide the plurality of values in response to the query.

18. The computer-readable storage media of claim 16, wherein the computer-executable instructions further cause the at least one processor to:

receive a file from the user defining the first custom data type, the file formatted using a serialized data structure; and convert the serialized data structure into the first custom data type.

19. The computer-readable storage media of claim 18, wherein the computer-executable instructions further cause the at least one processor to:

identify in the file source value data; and compose the series of bytes to be stored in the first field.

20. The computer-readable storage media of claim 16, wherein the computer-executable instructions further cause the at least one processor to:

decompose the series of bytes from the first field of the first values record into a plurality of values using at least the first custom data type;

create a plurality of key-value pairs from the plurality of values, each key-value pair including a name associated with a sub-value and the sub-value; and create a document including the plurality of key-value pairs.

21. The computer-readable storage media of claim 20, wherein the computer-executable instructions further cause the at least one processor to:

identify the document during a search for the sub-value contained in the document; and identify the target record based at least in part on a reference identifier identified as a result of the search for the sub-value.

22. The computer-readable storage media of claim 16, wherein the computer-executable instructions further cause the at least one processor to:

provide to the user a graphical interface;

present to the user a plurality of custom data types defined in the custom data types table using the graphical interface; and create a new custom values record in the custom values table based at least in part on selection of one of the plurality of custom data types presented to the user.

* * * * *